US011805065B2

(12) United States Patent
Singh et al.

(10) Patent No.: US 11,805,065 B2
(45) Date of Patent: Oct. 31, 2023

(54) SCALABLE TRAFFIC MANAGEMENT USING ONE OR MORE PROCESSOR CORES FOR MULTIPLE LEVELS OF QUALITY OF SERVICE

(71) Applicant: Intel Corporation, Santa Clara, CA (US)

(72) Inventors: Jasvinder Singh, Shannon (IE); John J. Browne, Limerick (IE); Tomasz Kantecki, Ennis (IE); Chris Macnamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 16/287,339

(22) Filed: Feb. 27, 2019

(65) Prior Publication Data

US 2019/0199646 A1   Jun. 27, 2019

(51) Int. Cl.
*H04W 72/12* (2023.01)
*H04L 47/50* (2022.01)
(Continued)

(52) U.S. Cl.
CPC ............ *H04L 47/58* (2013.01); *H04L 1/1854* (2013.01); *H04L 1/1887* (2013.01);
(Continued)

(58) Field of Classification Search
CPC ..... H04J 11/0023; H04J 3/085; H04L 1/1854; H04L 1/1887; H04L 12/5693;
(Continued)

(56) References Cited

U.S. PATENT DOCUMENTS 6,570,883 B1* 5/2003 Wong ................. H04L 47/2433
370/395.42
10,158,578 B2  12/2018 Dumitrescu et al.
(Continued)

OTHER PUBLICATIONS

Vinay G. Vaidya, Priti Ranadive and Sudhakar Sah, "Dynamic Scheduler for Multi-core Systems," 2nd International Conference on Software Technology and Engineering, IEEE (2010) V1-13-V1-16.*
(Continued)

*Primary Examiner* — Salvador E Rivas
(74) *Attorney, Agent, or Firm* — Compass IP Law PC

(57) ABSTRACT

Packets are differentiated based on their traffic class. A traffic class is allocated bandwidth for transmission. One or more core or thread can be allocated to process packets of a traffic class for transmission based on allocated bandwidth for that traffic class. If multiple traffic classes are allocated bandwidth, and a traffic class underutilizes allocated bandwidth or a traffic class is allocated insufficient bandwidth, then allocated bandwidth can be adjusted for a future transmission time slot. For example, a higher priority traffic class with excess bandwidth can share the excess bandwidth with a next highest priority traffic class for use to allocate packets for transmission for the same time slot. In the same or another example, bandwidth allocated to a traffic class depends on an extent of insufficient allocation or underutilization of allocated bandwidth such that a traffic class with insufficient allocated bandwidth in one or more prior time slot can be provided more bandwidth in a current time slot and a traffic class with underutilization of allocated bandwidth can be provided with less allocated bandwidth for a current time slot.

21 Claims, 13 Drawing Sheets

(51) Int. Cl.

| | |
|---|---|
| *H04L 47/60* | (2022.01) |
| *H04L 47/52* | (2022.01) |
| *H04L 47/62* | (2022.01) |
| *H04L 47/80* | (2022.01) |
| *H04L 49/90* | (2022.01) |
| *H04L 47/74* | (2022.01) |
| *H04L 47/525* | (2022.01) |
| *H04L 1/1867* | (2023.01) |
| *H04W 72/1263* | (2023.01) |
| *H04L 1/1829* | (2023.01) |
| *H04W 52/02* | (2009.01) |
| *H04J 3/08* | (2006.01) |
| *H04L 12/437* | (2006.01) |
| *H04W 52/26* | (2009.01) |
| *H04L 41/5009* | (2022.01) |
| *H04L 12/40* | (2006.01) |

(52) U.S. Cl.
CPC .......... *H04L 47/522* (2013.01); *H04L 47/525* (2013.01); *H04L 47/60* (2013.01); *H04L 47/6215* (2013.01); *H04L 47/74* (2013.01); *H04L 47/805* (2013.01); *H04L 47/808* (2013.01); *H04L 49/9031* (2013.01); *H04W 52/0216* (2013.01); *H04W 72/12* (2013.01); *H04W 72/1263* (2013.01); *H04J 3/085* (2013.01); *H04L 12/4015* (2013.01); *H04L 12/437* (2013.01); *H04L 41/5012* (2013.01); *H04W 52/265* (2013.01)

(58) Field of Classification Search
CPC . H04L 47/50; H04L 12/4015; H04L 12/2417; H04L 12/2471; H04L 41/50; H04L 41/5012; H04L 47/805; H04L 12/437; H04W 72/00; H04W 72/12; H04W 52/0216; H04W 72/1263; H04W 52/265; G05B 2219/31222; G05B 2219/34418
See application file for complete search history.

(56) References Cited

U.S. PATENT DOCUMENTS

| | | | |
|---|---|---|---|
| 2007/0113023 A1* | 5/2007 | Arulambalam | G06F 13/1605 711/147 |
| 2007/0195761 A1* | 8/2007 | Tatar | H04L 49/1546 370/389 |
| 2014/0126907 A1* | 5/2014 | Hirth | H04Q 11/0062 398/58 |
| 2016/0044695 A1* | 2/2016 | Gunner | H04L 49/90 370/336 |
| 2017/0070356 A1* | 3/2017 | Dumitrescu | H04L 47/50 |
| 2017/0093677 A1* | 3/2017 | Skerry | H04L 43/20 |
| 2019/0007330 A1 | 1/2019 | Browne et al. | |
| 2020/0201671 A1* | 6/2020 | Samih | G06F 9/3851 |

OTHER PUBLICATIONS

"H-QoS Technology White Paper", Ruijie, 2000-2017, pp. 1-37 (Year: 2017).*
Cisco, "Configuring Weighted Random Early Detection", Cisco IOS Quality of Service Solutions Configuration Guide, Release 12.2, QC-189, Jan. 30, 2014, 16 pages.
Halachmi, Nir, "What is HQoS and how is it different from Qos?", retrieved from http://www.telco..com/blog/hqos-solution-from-telco-systems, Jun. 17, 2011, 3 pages.
Huawei, "Huawei HQoS Technical White Paper", Huawei Technologies Co., Ltd., 2010, 14 pages.
Wallace, Kevin, "Cisco IP Telephony Flash Cards: Weighted Random Early Detection (WRED)" retrieved from https://www.discopress.com.articles/articel.asp, Home > Articles > Cisco Network Technology > IP Communications/VoIP > Cisco IP Telephony Flash Cards: Weighted Random Eady Detection (WRED), Nov. 24, 2004, 3 pages.

* cited by examiner

SCALABLE TRAFFIC MANAGEMENT USING ONE OR MORE PROCESSOR CORES FOR MULTIPLE LEVELS OF QUALITY OF SERVICE

TECHNICAL FIELD

Various examples described herein relate to techniques for allocating packets for transmission.

BACKGROUND

As the number of devices connected to the Internet grows, increasing amounts of data and content are transmitted using wired and wireless network interfaces, switches, and routers, among others. As packet transmission rates increase, the speed at which packet processing is to take place has also increased. Hierarchical quality of service (HQoS) is used in wireless networks and broadband wired networks to provide quality of service to particular users. HQoS attempts to ensure sufficient bandwidth is allocated for users based on their subscriptions or service level agreements. By contrast, some QoS schemes focus on ensuring transport prioritization without distinguishing the user or service.

DETAILED DESCRIPTION

Figure 1A:
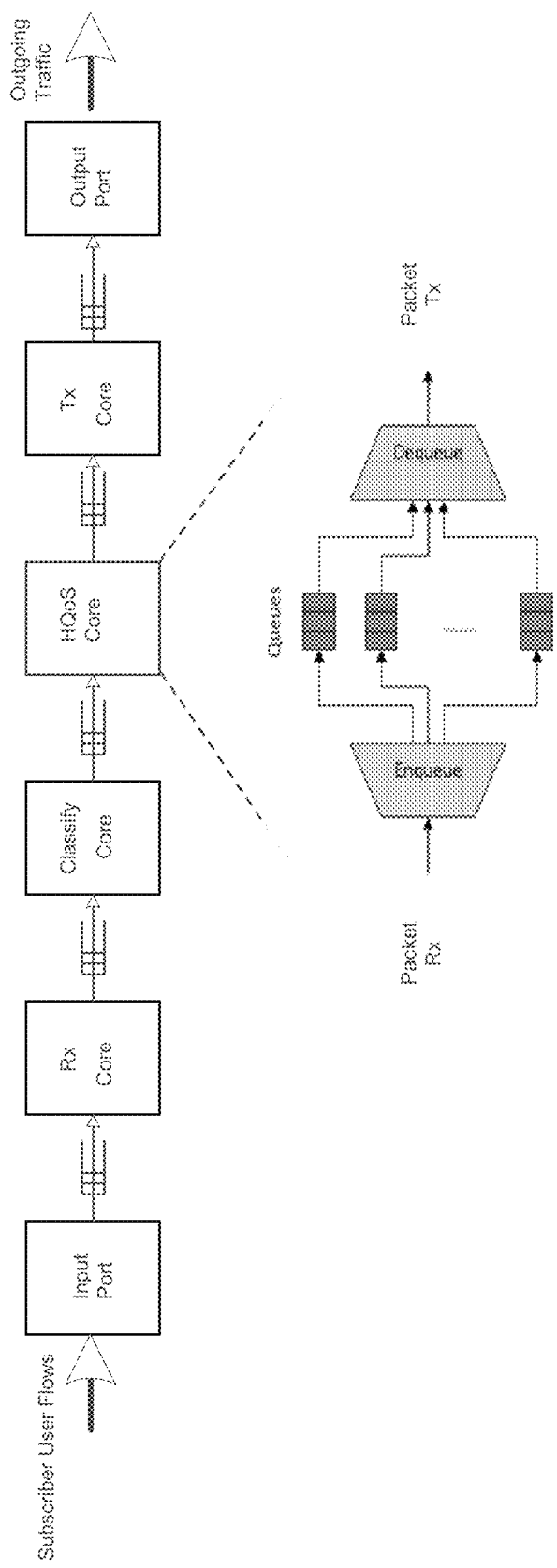
FIG. 1A depicts an example of an HQoS-based traffic management solution.

FIG. 1A depicts an example of an existing HQoS-based traffic management solution. The existing HQoS-based system uses a single core for traffic enqueue and dequeue operations. For example, a Data Plane Development Kit (DPDK) 5-level HQoS scheduler runs on a single core and performs egress traffic management by prioritizing the packets of different service types and subscribers as per Service Level Agreements (SLAs) before packets are transmitted through a network interface port. In a known approach, a core running the HQoS scheduler handles packets of all the traffic classes and subscribers for the network interface or an outgoing network interface port. The core can allocate packets to queues and dequeue packets for transmission. Use of a single core can avoid use of queue locking when dequeuing packets from multiple queues. However, if a number of subscribers per network interface grows significantly or when high-bandwidth network interfaces are employed, the core may become overloaded and exhibit slow performance.

In some cases, the congestion management strategy selected in HQoS uniformly may apply to all traffic classes regardless of the traffic sensitivity. For example, when Weighted Random Early Detection (WRED) is used, the traffic with strict-priority (e.g., highest sensitivity to packet drop) can face a similar packet dropping policy as that of the low priority traffic class.

Figure 1B:
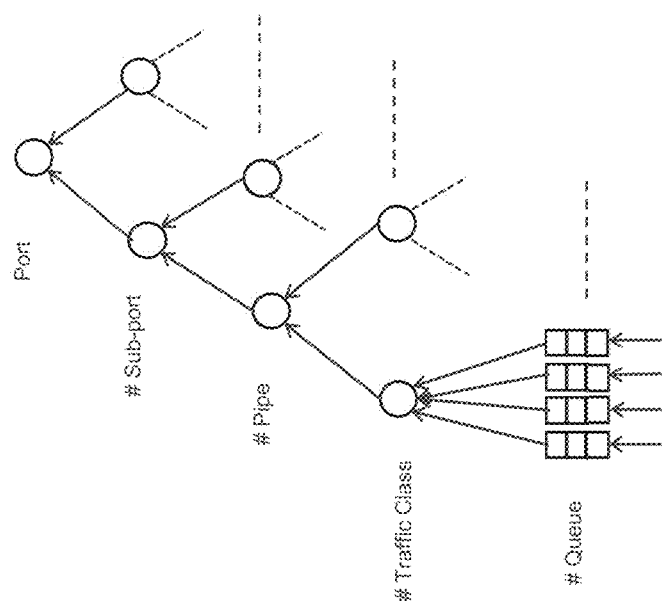
FIG. 1B depicts an example manner by which contents of multiple queues are allocated for transmission from a port.

FIG. 1B depicts an example manner by which contents of multiple queues are allocated for transmission from a port. Packets can be allocated to one or more queues. Packets from queues can be assigned to a traffic class. Multiple traffic classes can be allocated to a pipe. Multiple pipes can be allocated to a sub-port. And multiple sub-ports can be allocated to an output port for transmission from a network interface to a device, switch, router, or end-point using a medium.

Various embodiments provide for scaling Quality of Service (QoS) traffic management mechanism across multiple cores, while potentially achieving throughput goals, latency goals, packet ordering goals, and individual subscriber SLAs. Various embodiments can be used in any or a combination of wide area network wireless systems (e.g., 4G, 5G, 6G, IEEE 802.3, IEEE 802.11, and so forth), cable access, or broadband networks (e.g., Ethernet, internet protocol (IP), and so forth). Various embodiments can be used in computing or server platforms as well as by network interfaces. When high-bandwidth Ethernet interfaces (40 Gbps, 100 Gbps, and so forth) are used or a number of subscribers per network interface grow significantly, various embodiments can scale to use multiple cores or threads to handle packet enqueueing and dequeuing for transmission. Different traffic classes have unique QoS requirements and a congestion management strategy can be selected relative to traffic criticality (e.g., WRED, tail-drop, and so forth). During packet classification, a traffic class of a packet is determined and based on the traffic class, if a packet belongs to a specific traffic class that is congested, an appropriate congestion management scheme is applied. A number of traffic priority classes can be adjusted (e.g., 4 class, 8 class, 12 class, and so forth).

Various embodiments provide for sharing of unused bandwidth for a time slot or time slice. Packet scheduling transmission for a lower priority traffic class can utilize the bandwidth not consumed by a higher priority traffic class in addition to bandwidth allocated to such lower priority traffic class. In some examples, a highest priority traffic class can use an allocated bandwidth to allocate transmission bandwidth for packets associated with a queue for the highest-priority traffic class. For a designated transmission time slot, any excess bandwidth after transmission bandwidth allocation can be shared for use by a next highest-priority traffic class. A lockless message queue can be used to share the bandwidth allocation with the next highest-priority traffic class. For the designated transmission time slot, the next highest-priority traffic class can use an allocated bandwidth together with the excess bandwidth for allocation to packets associated with a queue for the next highest-priority traffic class. If extra transmission bandwidth is available for sharing with a next highest-priority traffic class, it can be shared.

After the lowest priority traffic class allocates packets for transmission, a transmit scheduler can be notified of the transmission time slot for which all packets have been allocated and the transmit scheduler can cause packets allocated for transmission for a time slot to be transmitted.

In some embodiments, a core can be allocated to process packets associated with one or more levels of priority or one or more traffic classes. A class of service distributor can allocate a packet to a queue based on the priority level or traffic class. When enabled, multiple cores can operate in parallel to perform traffic class HQoS or QoS scheduling for packet transmission such that parallel processing can be performed on different classes of traffic on multiple cores. In some embodiments, a higher priority class of packets can be scheduled for transmission using a dedicated core or multiple cores, which can potentially reduce latency arising from transmit scheduling.

Various embodiments provide for traffic from fixed mobile converged networks (e.g., wired and wireless networks) where HQoS or QoS scheduling is to be applied on combined traffic from different types of networks (e.g., wired or wireless as well as different types of wired and wireless networks).

Figure 2:
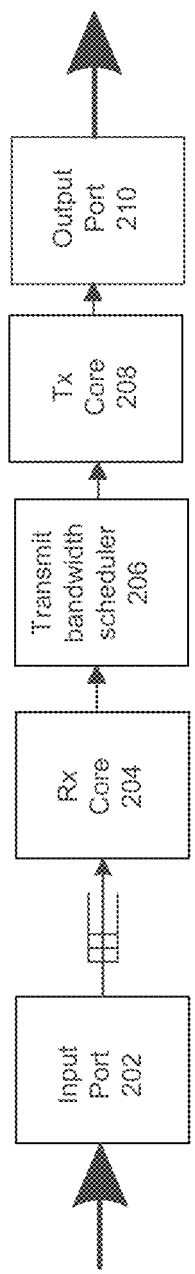
FIG. 2 depicts an example system that can use some embodiments.

FIG. 2 depicts an example system that can use some embodiments. An input port 202 can receive packets from a network medium. Receive (RX) core 204 can process received packets allocated to an input queue. RX core 204 can represent one or more cores, threads, instruction-executing processors, or fixed function hardware devices. Processing of received packets can include one or more of: determination if a packet is valid (e.g., correct Ethernet type, correct checksum, correct IP Protocol type, valid layers 4-7 protocol type), determination of packet destination (e.g., next hop, destination queue), use of Data Plane Development Kit (DPDK) or OpenDataPlane to perform one or more of: IP Filter checks, flow table lookup, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution. Received packets and processed packets can be stored in host memory accessible to processing elements of the system.

A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Cores can also include a system agent. System agent can include or more of: a memory controller, a shared cache, a cache coherency manager, arithmetic logic units, floating point units, core or processor interconnects, or bus or link controllers. System agent can provide one or more of: direct memory access (DMA) engine connection, non-cached coherent master connection, data cache coherency between cores and arbitrates cache requests, or Advanced Microcontroller Bus Architecture (AMBA) capabilities.

Transmit bandwidth scheduler 206 can allocate received packets to a priority or traffic class queue and allocate transmit bandwidth to packets associated with users for some or all priority or traffic class queues. In some examples, for a time slot, excess bandwidth after allocation of packets for transmission from a first priority level can be shared and combined with allocated bandwidth for packets for transmission from a different, lower priority level. In some examples, bandwidth can be allocated for transmission for a time slot using a policy that tracks actual bandwidth usage by a priority level and adjusts bandwidth allocation based on past usage.

For packets allocated for transmission for a time slot, transmit (TX) core 208 can perform packet processing for transmission, management of access control lists/IP filter rules, count packets transmitted, count and discard packets in the case of link failure, cause packets to be broadcast, or cause packets to be multi-cast. TX core 208 can represent one or more cores, threads, instruction-executing processors, or fixed function hardware devices.

In some embodiments, packets provided for transmission can be provided from a host device instead of from an input port and transmit bandwidth scheduler 206 and one or more instances of TX core 208 can be used to transmit packets using one or more output ports. Wireless network interfaces can provide packets for transmission.

Figure 3:
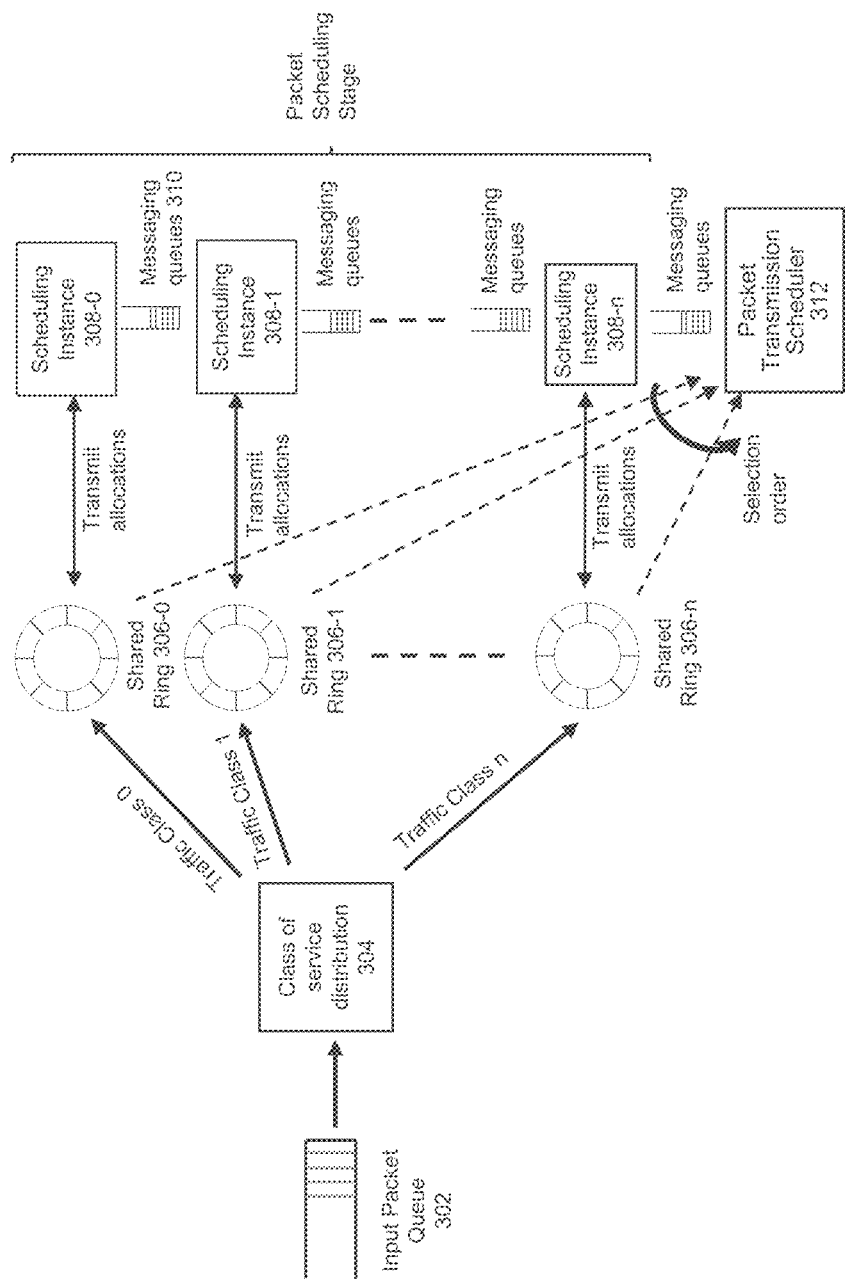
FIG. 3 depicts an example system in accordance with some embodiments.

FIG. 3 depicts an example system. This system can be used by or included in a network interface, smart network interface controller, computing sled, and/or host computing platform, among others. Input packet queue 302 can reference one or more packets that are stored in memory. The packets can be stored in memory and provided for transmission by a host system or processed for retransmission, among others. For example, descriptors or metadata can be stored in input packet queue 302 that describe a packet storage location and information such as packet length, timestamp, sequence number, and so forth. Class of service distributor 304 can decode a packet header to determine traffic classification for packets allocated to input queue 302. Traffic classifications can be any of a traffic class 0, traffic class 1, up to a traffic class n, where n is an integer of 2 or more, although merely two traffic classes can be used. Packets allocated to a traffic class can be associated with a shared ring. For example, a shared ring 306-0 can be associated with a traffic class 0, a shared ring 306-1 can be associated with a traffic class 1, and so forth. For example, a virtual local access network (vLAN) tag provided with a packet can define a user's packet priority (e.g., premium, normal, service level agreement (SLA)), a traffic class (priority 0-N), permitted jitter, permitted latency, and so forth. For example, Differentiated Services Code Point (DSCP) values (e.g., 6 bits) in an IPv4 header can define a traffic class (e.g., expedite, forward), type of traffic (e.g., user such as voice, video, web content, text messaging, and so forth). In some examples, an application can indicate type of traffic/user (e.g., voice, video, web content, text messaging, and so forth). In case of packet with double VLAN tag (e.g., QinQ) in the header, a user is determined from CVLAN id field of the QinQ, while service provider is determined using SVLAN id. Class of service distributor 304 can be implemented as a process or thread executed by one or more cores, an application specific integrated circuit (ASIC), field programmable gate array (FPGA), programmable control logic (PLC), or other processor.

Class of service distribution 304 can generate metadata for a packet and store the metadata into a shared ring among shared rings 306-0 to 306-n. For example, metadata can include: timestamp, forward, drop indication, scheduling status, packet color, output port number, and so forth. Metadata information can used and updated by the packet scheduling instances 308-0 to 308-n. A traffic stream of packets can be marked with special flags (i.e., colored) to indicate their drop precedence. The packets are colored green, yellow and red depending upon the packets rate at the network devices. For example, RFCs 2697, 2698, and 4115 provide approaches used for packet coloring. In the presence of congestion, red packets are dropped with higher probability than yellow, which in turn are dropped with a higher probability than green.

An example description of shared rings 306-0 to 306-n is provided next. A shared ring can reference packets of a specific traffic class (e.g., class 0 to class n). A shared ring can be lockless. Packets from a variety of users belonging to a particular traffic class are associated with the same ring. In some embodiments, a shared ring can include a fixed number of slots and a prescribed number of slots are assignable to a particular user or application. A packet of a specific traffic class associated with a user will be placed in the slot that is allocated to that user in the ring designated for the specific traffic class.

In some embodiments, shared rings 306-0 to 306-n can be designed using DPDK Ordered Packet Distributor Library (OPDL) that allows updating the packet metadata on the ring, without removing metadata from the ring. In some embodiments, OpenDataPlane (ODP) can be used to create shared rings. DPDK or ODP can be used by any of class of service distribution 304 or scheduling instances 308-0 to 308-n.

Scheduling instances 308-0 to 308-n can prepare the transmission schedule of the packets allocated to shared rings 306-0 to 306-n for processing respective traffic classes 0 to n. One or more cores can be allocated to perform a scheduling instance. In one example, one core can be used to allocate transmit bandwidth for a particular class of service. A scheduling instance consumes the available bandwidth credits by dividing them among the users in a ring and allocating credits based on user priority. If there are insufficient available credits for packets in a shared ring for transmission, those packets are marked by a scheduling instance for transmission in the next time slot or marked as dropped depending upon the applied congestion management strategy. Various congestion management strategies can be applied such as head drop, tail drop, Weighted Random Early Detection (WRED), Low latency queueing (LLQ), among others. For example, in case of real time or time sensitive traffic, WRED may not be used as it might increase communication latency. Instead, LLQ or priority queue for congestion management could be used. Another example is for transmission control protocol (TCP) traffic, where using WRED based congestion management can be acceptable, but may not be acceptable for UDP, as WRED may not present any benefits and tail drop can be used for UDP.

Transmit bandwidth can be divided among all traffic classes 0 to n but a highest traffic class 0 can be allocated a highest amount of bandwidth, a next highest class (e.g., class 1) is allocated a next highest amount of bandwidth, and so forth. Within a traffic class, a highest amount of bandwidth can be allocated to highest priority user ID 0, a next highest amount of bandwidth can be allocated to highest priority user ID 1, and so forth. For example, a scheduling instance 308-0 associated with a highest priority ring 306-0 can scan a highest priority ring 306-0 with a variety of user IDs 0-10. Scheduling instance 308-0 can allocate packets associated with user IDs 0-4 but lacks bandwidth for user IDs 5-10. In that case, scheduling instance 308-0 can mark packets associated with user IDs 5-10 for a next time slot. Scheduling instance 308-0 can indicate in metadata that packet is transmission ready or a candidate for transmission in a next time slot or dropped. For users that have exceeded bandwidth needs or do not have sufficient bandwidth, scheduling instance 308-0 can set metadata state for those some packets that can be transmitted to transmit in next time slot or drop packets.

In an event that scheduling instance 308-0 has allocated bandwidth to all packets in shared ring 306-0 for a time slot, scheduling instance 308-0 can share excess bandwidth with a next highest priority ring (e.g., scheduling instance 308-1) using a lockless queue (e.g., messaging queue 310). Messaging queue 310 can be lock-free so that scheduling instances running on different central processing unit (CPU) cores can access it simultaneously without needing any locking/synchronization at the application level. Messaging queue 310 can use one queue for passing information from high priority traffic class to a low priority traffic class. For example, the queue can be implemented using the DPDK rte_ring library.

A lockless queue can be a circular buffer with a producer (instance writing to the queue) and the consumer (instance reading from the queue) potentially running in parallel. Using messaging queues, available/surplus bandwidth can be transferred from scheduling instance 308-0 to scheduling instance 308-1, scheduling instance 308-1 to scheduling instance 308-2, and so forth. Thus, a scheduling instance, when finished with packet scheduling, communicates the time-stamp value and the unused bandwidth to the next instance and this continues until all instances receive messages to indicate whether there is any surplus bandwidth to allocate for a current round.

For example, scheduling instance 308-0 can communicate the time-stamp index or value (e.g., timestamp 0) and associated unused bandwidth credits to next instance dealing with next traffic-class (e.g., scheduling instance 308-1) before continuing onto the next round of packet scheduling (e.g., timestamp 1). Scheduling instance 308-0 can start allocating bandwidth for packets in ring 306-0 for a next timestamp (e.g., timestamp 1) after scheduling instance 308-0 finishes allocating bandwidth for a prior time stamp (e.g., timestamp 0). Likewise, after scheduling instance 308-1 schedules packets for transmission associated with ring 306-1, scheduling instance 308-1 can communicate the time-stamp index or value (e.g., timestamp 0) and associated unused bandwidth credits to next instance dealing with next traffic-class (e.g., scheduling instance 308-2) before continuing onto the next round of packet scheduling. Scheduling instance 308-1 can start allocating bandwidth for packets in ring 306-1 for a next timestamp (e.g., timestamp 1) after scheduling instance 308-1 finishes allocating bandwidth for a prior time stamp (e.g., timestamp 0).

Scheduling instances 308-0 to 308-n can be synchronized through the time reference provided by timestamp. A timestamp can be used to represent a specific round or cycle in which bandwidth credits that are unused by a higher priority traffic-class are allowed to be used by a lower priority traffic-class. Scheduling instance 308-0 dealing with highest priority traffic-class can compute the current timestamp. Other scheduling instances 308-1 to 308-n use this timestamp value to compute the available credits and subsequently schedule their packets placed in their respective shared rings (e.g., shared rings 306-1 to 306-n). For example, credits can be determined in a manner described with respect to FIGS. 4B and 4C.

In some examples, scheduling instances 308-0 to 308-n can be implemented using processes or threads executed by respective cores 0 to n. A core 1 executing scheduling instance 308-1 can poll the message queue for messages and so forth. Scheduling instances 308-0 to 308-n can be implemented using an application specific integrated circuit (ASIC), field programmable gate array (FPGA), programmable control logic (PLC), or other processor. Depending upon the traffic volume, a scheduling instance could be implemented on multiple cores 0 to m. A core can run one or multiple instances of the packet scheduling stage for the traffic-class rings. In some examples, a scheduling instance for a shared ring can be implemented using multiple cores. In some examples, a core can be allocated to scheduling bandwidth for a particular user in a shared ring such that cores 0 to m can be used to allocate bandwidth for respective multiple users 0 to m on a shared ring. Other configurations can be used.

Packet transmission scheduler 312 receives a message using the messaging queue from the lowest priority scheduling instance (lowest-priority traffic class) associated with shared ring 306-n. The timestamp provides the reference of the round to select the packets from the shared-rings for transmitting the packets in an orderly manner. Packet transmission scheduler 312 scans packets in a traffic class shared rings starting from the highest priority traffic class through the lowest priority shared ring (e.g., shared ring 306-0 to shared ring 306-n) and causes the packets to be prepared for transmission through a network interface (not depicted) from an output port. For example, the system of FIG. 2 can be used for transmission of packets using one or more output ports.

Figure 4A:
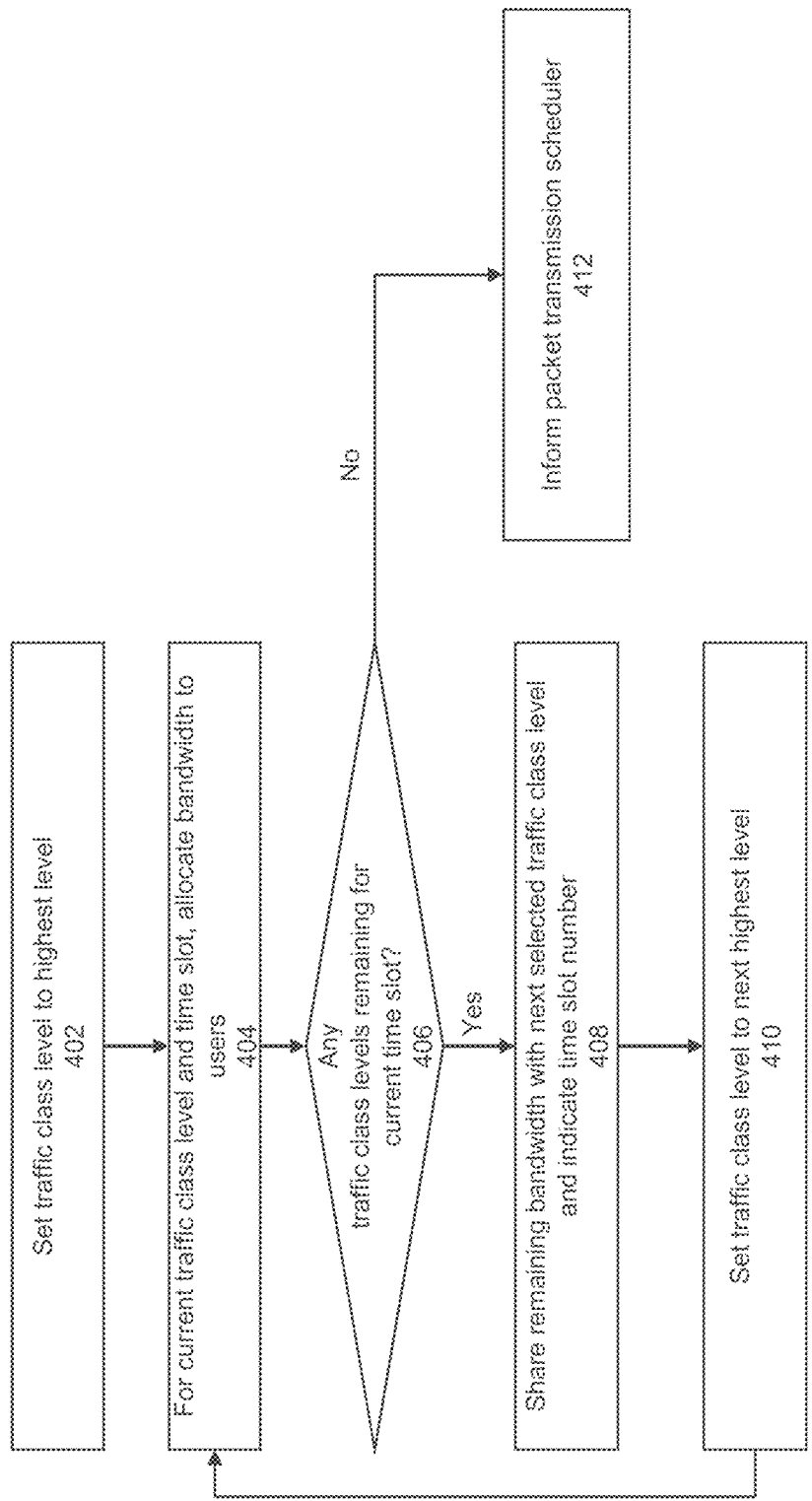
FIG. 4A depicts a process in accordance with some embodiments.

FIG. 4A depicts a process. The process can be used to allocate bandwidth to packets or content for transmission where packets can be associated with one or more levels of priority or quality of service. At 402, a current traffic class level is set to a highest level. At 404, bandwidth can be allocated to packets associated with users allocated to the current service level. In some examples, user packets within the current traffic class level can have various priority levels such that more bandwidth is allocated to a user with a higher priority level than another user with a lower priority level within the same traffic class level, although other schemes can be used. After all packets available for transmission from a traffic class level are allocated bandwidth, surplus bandwidth, no bandwidth, or a bandwidth deficit can result. A bandwidth deficit can correspond to insufficient bandwidth to transmit packets available for transmission for the current traffic class level. Packets not afforded transmit bandwidth allocation can be transmitted in a later round or timeslot or dropped, depending on an applied congestion management policy for the traffic class or user priority level. At 406, a determination is made as to whether any traffic class levels are remaining in the current round or timeslot for which transmission scheduling has not taken place. If any priority levels are remaining in the current round or timeslot for which transmission scheduling has not taken place, then 408 can follow. If no priority levels are remaining in the current round or timeslot for which transmission scheduling has not taken place, then 412 can follow.

At 408, any remaining bandwidth from the current traffic class level can be shared with next highest traffic class level. For example, a message can be provided using a lockless queue to indicate surplus bandwidth with an indication of the current time slot. At 410, a traffic class level can be set to a next highest level. Actions 404 can follow with the available bandwidth plus a surplus bandwidth, if any, allocated to the next highest traffic class level for transmission allocation.

In some examples, a first core can be used to allocate transmit bandwidth to a highest priority level and a second core can be used to allocate transmit bandwidth to a next highest priority level, and so forth. In that case, while the second core is allocating transmit bandwidth for packets of a next highest priority level for a time slot, the first core can allocate bandwidth to packets in a next time slot.

At 412, after packets from all traffic class levels for a time slot have been allocated for transmission, the packet transmission scheduler can be informed. The packet transmission scheduler can allow packets selected for transmission from a current time slot to be prepared for transmission through one or more output ports of a network interface.

Figure 4B:
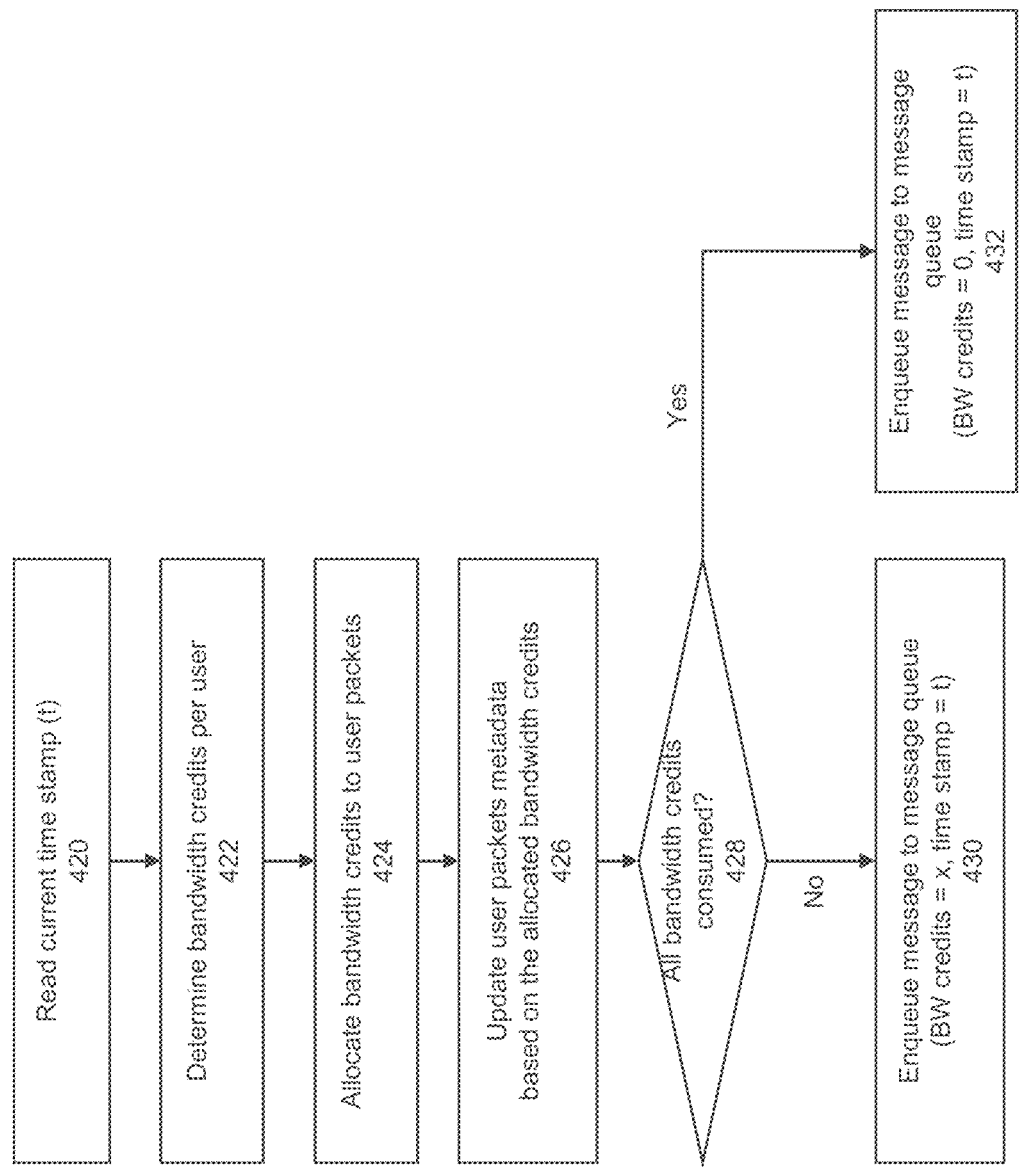
FIG. 4B depicts an example process in accordance with some embodiments.

FIG. 4B depicts an example process. The process can be used to allocate bandwidth to packets associated with a highest priority or traffic class. The process can be performed by one or more cores that are designated to allocate bandwidth to packets associated with a highest priority or class of service. At 420, a current time stamp can be read. For example, a time stamp can be generated by reading the current time obtained either through Time-Stamp Counter (TSC) register or the High Precision Event Timer (HPET) register, or time-based counters. The current timestamp can be represented in time_bytes converted from number of CPU clock cycles, where time_bytes=time_cycles/cycles_per_byte and cycles_per_byte is equivalent to CPU cycles required to transmit one byte. For example, a CPU frequency of 3 GHz and a 10 Gbps Ethernet interface, cycles_per_byte=2.4. At 422, an amount of bandwidth credits allocated per user is determined. For example, the credits allocated per user can be determined based on:

Bandwidth credits per user=$BW$ credits/$n$ users,
where:

$BW$_credits=$n$_periods*credits per period;

$n$_periods=($t$–$tp$)/time_period_duration;

$t$=current time stamp;

$tp$=previous time stamp;

time_period_duration=time period that should be elapsed in order for credits_per_period to be awarded where the value can be configurable at the application level and can be same for all priority levels; and credits per period=credits allocated per period, which can be same for all the priority levels. Aggregated credits, computed for the current time stamp, are divided among all users.

At 424, bandwidth credits are allocated to user packets. Credits can be evenly allocated across all user packets available for transmission in the highest priority level packet ring. In some examples, packets of a highest priority user are allocated more bandwidth credits than packets of a next highest priority user and so forth. A unit of a credit can be in byte, where 1 credit=1 byte, or some other value. Depending upon the credits available for allocation, a user's packets are selected for transmission and at 426, packet metadata is updated with time stamp value and status indicator indicating packets being ready for next stage (e.g., transmission, wait for next time stamp/round, or drop). Actions 424 and 426 occur for all user packets available for transmission for a traffic class. At 428, a determination is made as to whether all bandwidth credits have been consumed. If any credits are available after allocation in 424, then at 430, a message is enqueued in a message queue indicating a number of credits available, x, and the current time stamp, t. If no credits are available after allocation after 424, then at 432 a message is enqueued in a message queue indicating a number of credits available (i.e., 0) and the current time stamp, t. The message queue can be read by a scheduler that handles packets associated with the next highest priority.

Figure 4C:
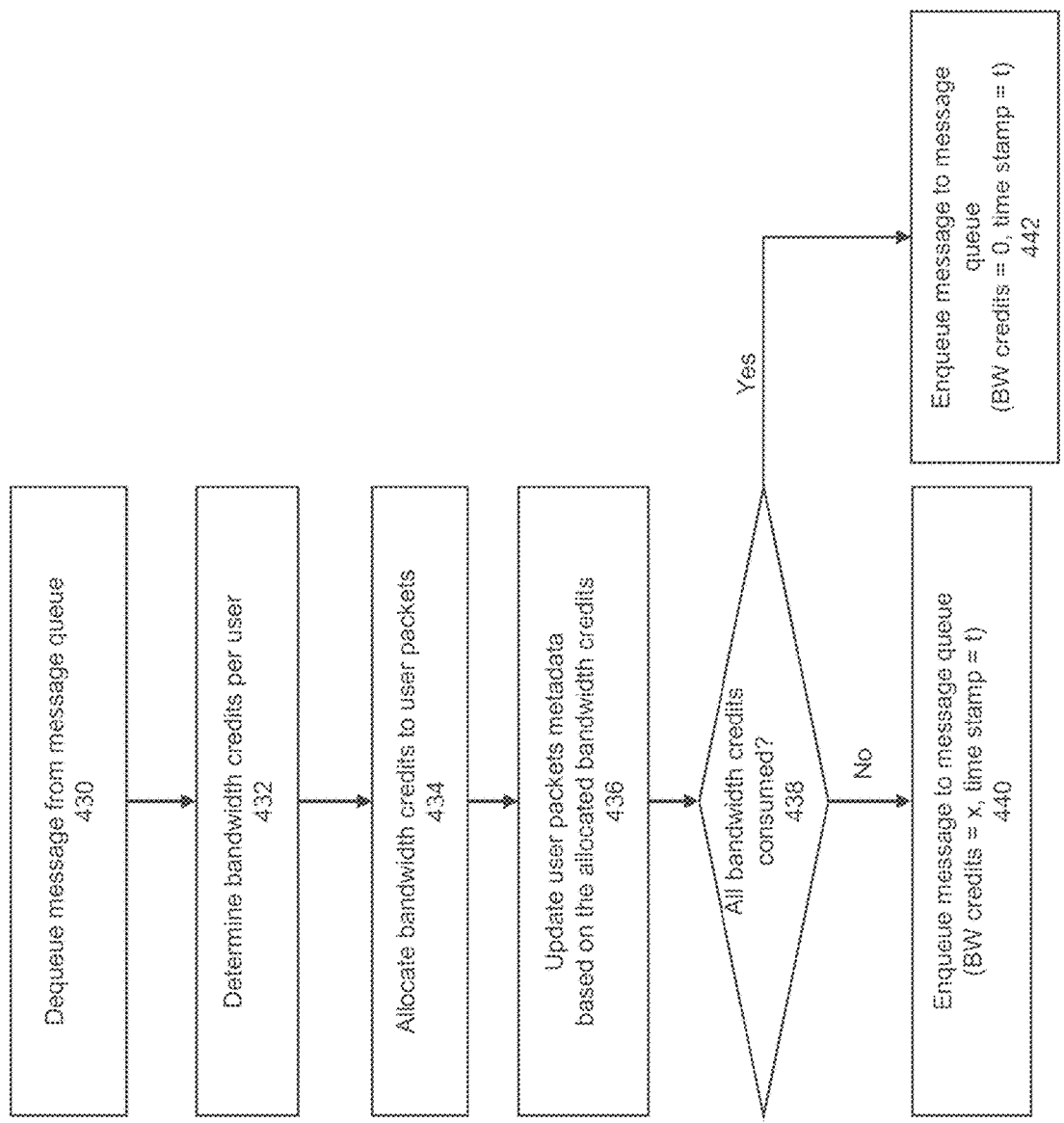
FIG. 4C depicts an example in process in accordance with some embodiments.

FIG. 4C depicts an example process. The process can be used to allocate bandwidth to packets associated with a priority or traffic class level that is not the highest level priority or class of service. The process can be performed by one or more cores that are designated to allocate bandwidth to packets associated with a priority level or class of service level. At 430, a message can be dequeued from a message queue. For example, the message queue can be a lockless ring. A core can poll the message queue to determine if any new messages are available. The message queues can be implemented using single-producer single-consumer lockless queues, e.g., circular buffers stored in the external double data rate (DDR) memory of the CPU (shared by all CPU cores) which have the consumer (e.g., CPU thread writing to the queue) and the producer (e.g., CPU thread reading from the queue) potentially running in parallel on two different CPU cores. The lockless queue mechanism works regardless of whether the consumer and the producer of a given lockless queue are the same CPU thread or two different CPU threads running on different CPU cores.

At 432, a determination is made as to a number of bandwidth credits available per user. For example, the following determination can be made.

Bandwidth credits per user=$BW$ credits/$n$_users,
where:

$BW$_credits=$n$_periods*credits per period;

$n$_periods=$(t-tp)$/time_period_duration;

$t$=current time stamp;

$tp$=previous time stamp;

time_period_duration=time period that should be elapsed in order for credits_per_period to be awarded where the value can be configurable at the application level and can be same for all priority levels; and credits per period=credits allocated per period, which can be same for all the priority levels.

At 434, bandwidth credits are allocated to user packets. Credits can be evenly allocated across all user packets available for transmission in the packet ring. In some examples, packets of a highest priority user are allocated more bandwidth credits than packets of a next highest priority user and so forth. A credit can represent one or more bytes. Depending upon the credits available for allocation, a user's packets are selected for transmission and at 436, packet metadata is updated with time stamp value and status indicator indicating packets being ready for next stage (e.g., transmission, wait for next time stamp/round, or drop). Actions 434 and 436 occur for all user packets available for transmission in the current traffic class. At 438, a determination is made as to whether all bandwidth credits have been consumed. If any credits are available after allocation in 434, then at 440 a message is enqueued in a message queue indicating a number of credits available, x, and the current time stamp, t. If no credits are available after allocation in 434, then at 442 a message is enqueued in a message queue indicating a number of credits available (i.e., 0) and the current time stamp, t. The message queue can be read by a scheduler that handles packets associated with the next highest priority. After a lowest traffic class scheduler has allocated packets for transmission, packets can be prepared for transmission through one or more output ports of a network interface.

Figure 5:
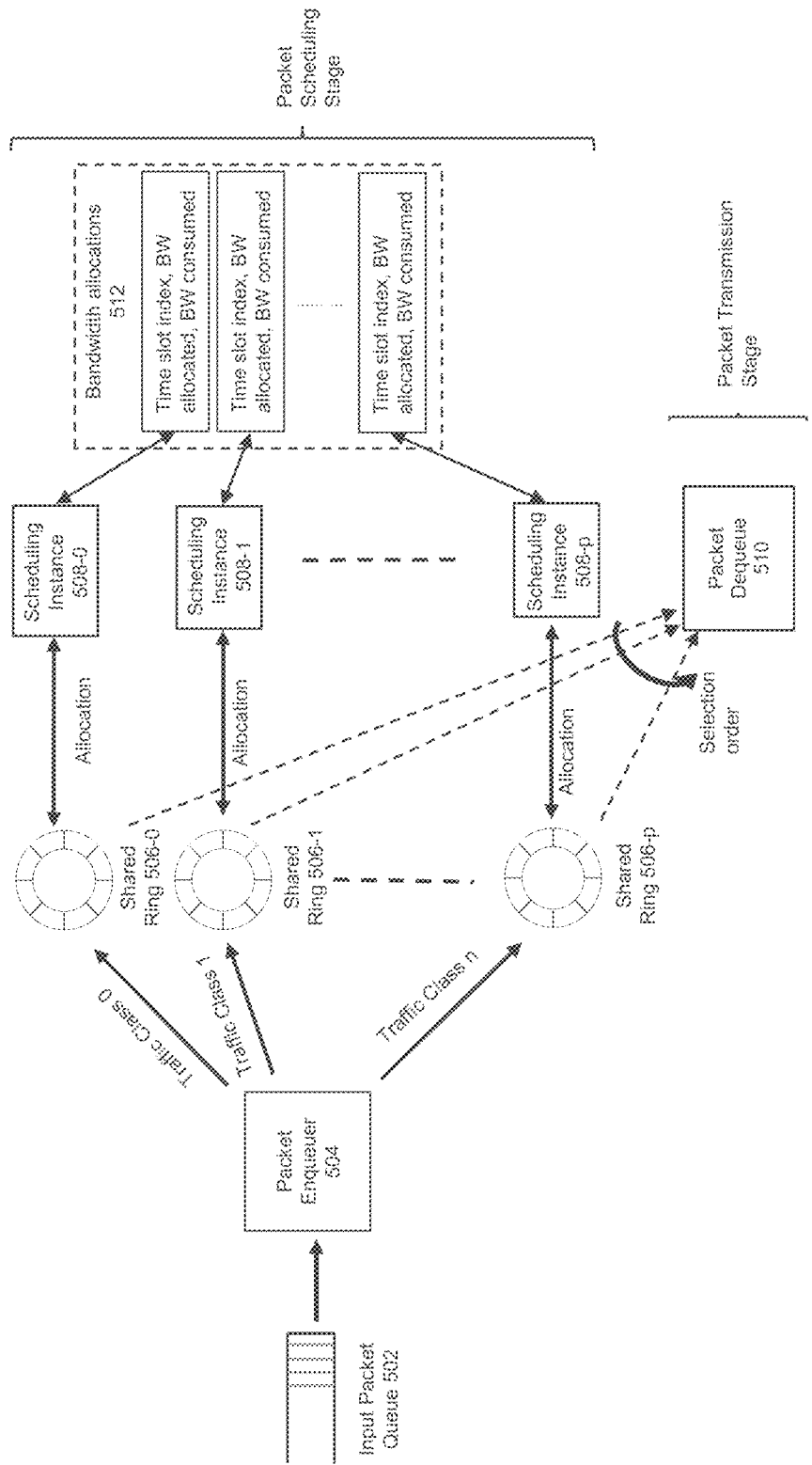
FIG. 5 depicts an example system in accordance with some embodiments.

FIG. 5 depicts an example of a system. For example, the system of FIG. 5 can be used with the system of FIG. 2 or in other embodiments described herein. Input packet queue 502 can reference one or more packets that are stored in memory. The packets can be stored in memory and provided for transmission by a host system or processed for retransmission, a wireless network interface, among others. For example, descriptors or metadata can be stored in input packet queue 502 that describe a packet storage location and information such as packet length, timestamp, sequence number, and so forth. Packet enqueuer 504 can decode a packet header to determine traffic classification for packets allocated to input queue 502. For example, a virtual local access network (vLAN) tag provided with a packet can define a user's packet priority (e.g., premium, normal, service level agreement (SLA)), a traffic class (priority 0-N), permitted jitter, permitted latency, and so forth. For example, Differentiated Services Code Point (DSCP) values (e.g., 6 bits) in an IPv4 header can define a traffic class (e.g., expedite, forward), type of traffic (e.g., user such as voice, video, web content, text messaging, and so forth). In some examples, an application can indicate type of traffic/user (e.g., voice, video, web content, text messaging, and so forth). In case of a packet with double VLAN tag (QinQ) in the header, a user can be determined from CVLAN id field of the QinQ, while service provider is determined using SVLAN id. Packet enqueuer 504 can be implemented as a process or thread executed by one or more cores, an application specific integrated circuit (ASIC), field programmable gate array (FPGA), programmable control logic (PLC), or other processor.

Traffic classifications can be any of a traffic class 0, traffic class 1, up to a traffic class n, where n is an integer of 2 or more. Packets allocated to a traffic class can be associated with a shared ring. For example, a shared ring 506-0 can be associated with a traffic class 0, a shared ring 506-1 can be associated with a traffic class 1, and so forth. Shared rings 506-0 to 506-*p* can be implemented in a similar manner as that of shared rings 306-0 to 306-*n*.

Scheduling instances 508-0 to 508-*p* determine allocated bandwidth (shown as "BW allocated") for a time slot and traffic class by reading bandwidth allocations 512. Scheduling instances 508-0 to 508-*p* can be implemented as a process or thread executed by one or more cores, an application specific integrated circuit (ASIC), field programmable gate array (FPGA), programmable control logic (PLC), or other processor. Bandwidth allocations 512 can be a region of memory. Scheduling instances 508-0 to 508-*p* can write bandwidth consumed for a time slot (shown as "BW consume") into a region associated with the scheduling instance. For example, for traffic class 0 and for a time slot 0, scheduling instance 508-0 can read BW allocated to determine allocated transmit bandwidth for packets associated with shared ring 506-0. Scheduling instance 508-0 to 508-*p* can read respective entries of BW allocated and BW consumed from an offset from a beginning of a memory region. For example, scheduling instance 508-0 can read time slot index, BW allocated, and BW consumed at an offset of zero from a beginning of a memory region allocated to bandwidth allocations 512. Likewise, scheduling instance 508-1 can read time slot index, BW allocated, and BW consumed at an offset from a beginning of a memory region allocated to bandwidth allocations 512, and so forth.

For time slot 0, scheduling instance 508-0 can allocate transmit bandwidth to packets associated with shared ring 506-0 and indicate an amount of bandwidth actually allocated to packets associated with shared ring 506-0 by writing the amount of bandwidth actually allocated to field BW consumed. Other scheduling instances can perform similar activities to determine transmit bandwidth allocation for a time slot and indicate amount of bandwidth used. A time slot index can be included for an entry of BW allocated and BW consumed to identify an associated time slot.

For a particular time slot, packet dequeue 510 prepares packets to be transmitted, and in that time slot, packet dequeue 510 scans the shared rings to select the packets which are marked for the transmission. For example, packets can be provided to one or more transmit core for transmission using one or more ports. Packet dequeue 510 can apply a policy to allocate and potentially re-distribute traffic bandwidth to scheduling instances 508-0 to 508-p for a particular a time slot or time-slice. The policy for the bandwidth adjustment can use a filter-based approach. For example, Exponential Weighted Moving Average (EWMA) can be used to smooth out short-term fluctuations and help to predict longer-term trends. For example, a particular scheduling instance for a priority level consumes 100% of the allocated bandwidth in the previous time slot, while the instance with a higher priority level consumes only 80% bandwidth in that same time slot. Packet dequeue 510 can allow lower priority traffic-class instance to increase the bandwidth allocation and decrease the bandwidth allocation to the high-priority traffic class for the current time-slice. Amount of bandwidth adjustments can depend upon the applied policy. In this example, a policy will allocate the total unused bandwidth among all the priority levels which have consumed relatively more bandwidth in a certain proportion. Exponentially Weighted Moving Average (EWMA) based scheme can be leveraged to form the policy. In some cases, a higher priority level that underutilizes allocated bandwidth can be provided with allocated bandwidth that may result in an underutilization whereas a lower priority may be allocated with more bandwidth but still insufficient based on its usage trends. In some cases, allocated bandwidth is prioritized towards higher priority classes even if underutilization occurs. Such technology can enable effective utilization of the available bandwidth when high priority traffic classes do not exhaust all the allocated bandwidth. This technique is scalable to any number of the traffic classes.

Figure 6:
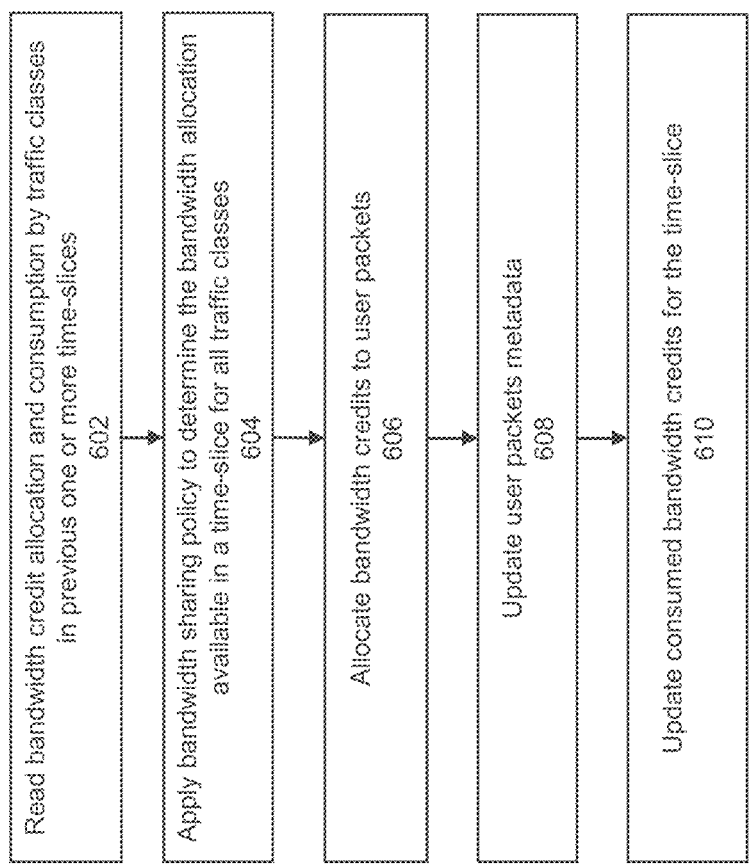
FIG. 6 depicts an example process in accordance with some embodiments.

FIG. 6 depicts an example process. Bandwidth credits available for scheduling instances are computed on the time-slice basis where time-slice (e.g., time slot) represents the subdivision of, for example, an interval of time (e.g., a second). The process can be used by multiple scheduling instances in parallel. At 602, the process can read bandwidth credit allocation and consumption of traffic classes in a previous one or more time-slices. At 604, the process can apply a bandwidth sharing policy to determine the bandwidth allocation available in a time-slice for all traffic classes. A bandwidth sharing policy is applied to allow scheduling instances to compute the bandwidth credits taking into account the bandwidth allocation and consumption of traffic classes in one or more previous time-slice(s). For example, if in a prior one or more time-slices, a scheduling instance for a traffic class 0 uses less than an allocated bandwidth but a traffic class 3 does not have sufficient bandwidth for packet transmissions and drops or delays packet transmissions, then the traffic class 0 can be allocated less bandwidth and traffic class 3 can be allocated additional bandwidth beyond its prior allocations. For example, actions 602 and 604 can be performed to determine bandwidth allocations for a time slot 3 based on consumed bandwidth for time slot 2, 1, and/or 0.

At 606, the process allocates bandwidth credits to user packets. For example, a scheduling instance can perform 606 to allocate bandwidth to packets associated with a traffic class and time slot based on a bandwidth allocation determined in 604. Available bandwidth for a time-slice and a traffic class can be indicated in a shared memory. The process can read the available bandwidth and time-slice for a traffic class from the shared memory. For example, for bandwidth allocated for time-slice 1 in 604, action 606 can allocate bandwidth credits to user packets for time-slice 1. At 608, the process updates user packet metadata based on the available credits. For example, user packet metadata can be stored in a shared ring and can be updated to indicate time-slice identifier, forward, drop indication, scheduling status, packet color, output port number, and so forth. At 610, the process updates the shared memory region with allocated and consumed bandwidth credits for the current time-slice and the applicable traffic class. After a lowest priority (e.g., lowest traffic class) scheduler has allocated packets for transmission, packets can be prepared for transmission through one or more output ports of a network interface. Thereafter, for a subsequent time-slice, bandwidth credit allocation can be made based on prior bandwidth credit usage for various traffic classes.

Figure 7:
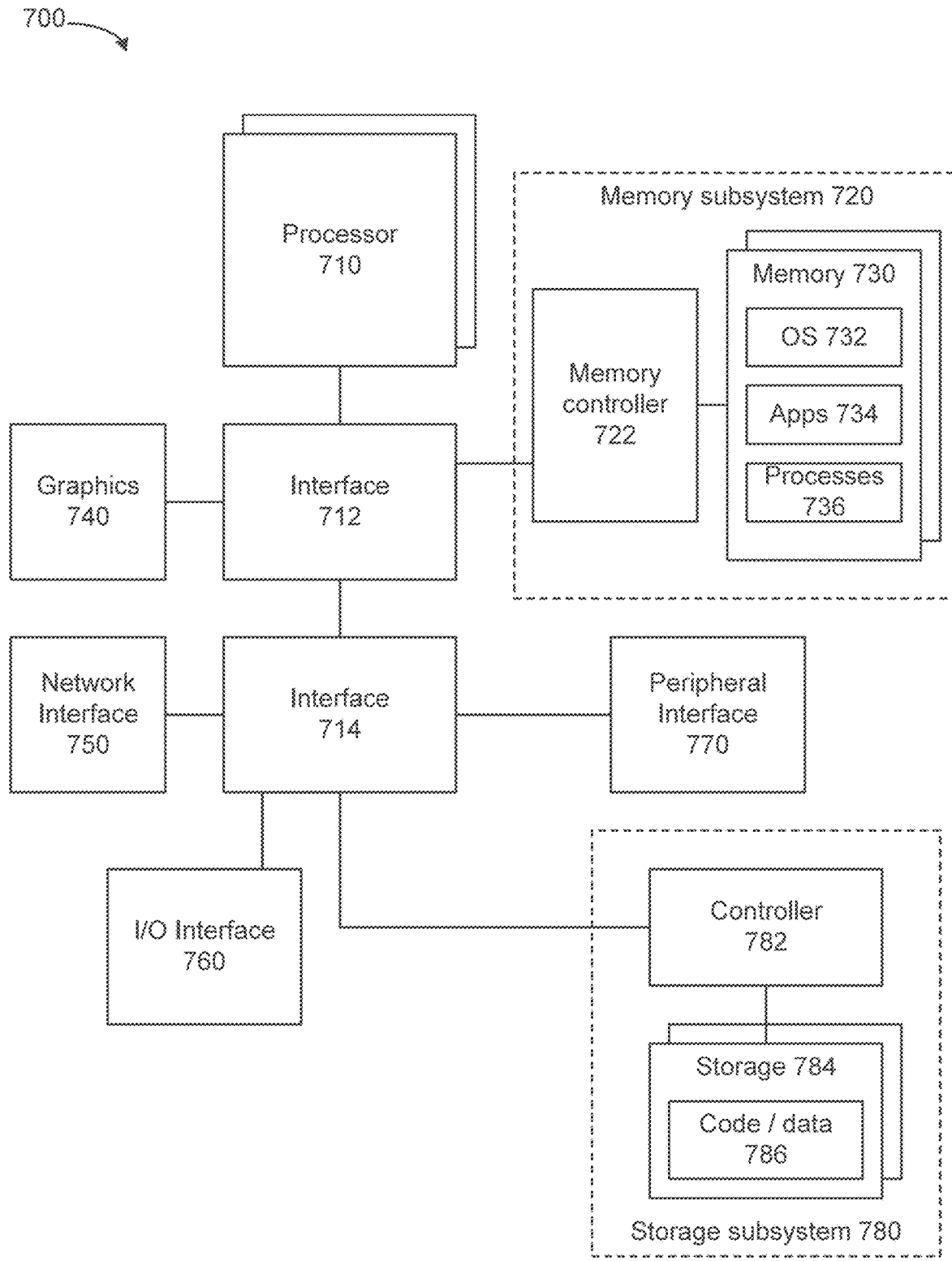
FIG. 7 depicts an example system in accordance with some embodiments.

FIG. 7 depicts a system. The system can use embodiments described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Figure 8:
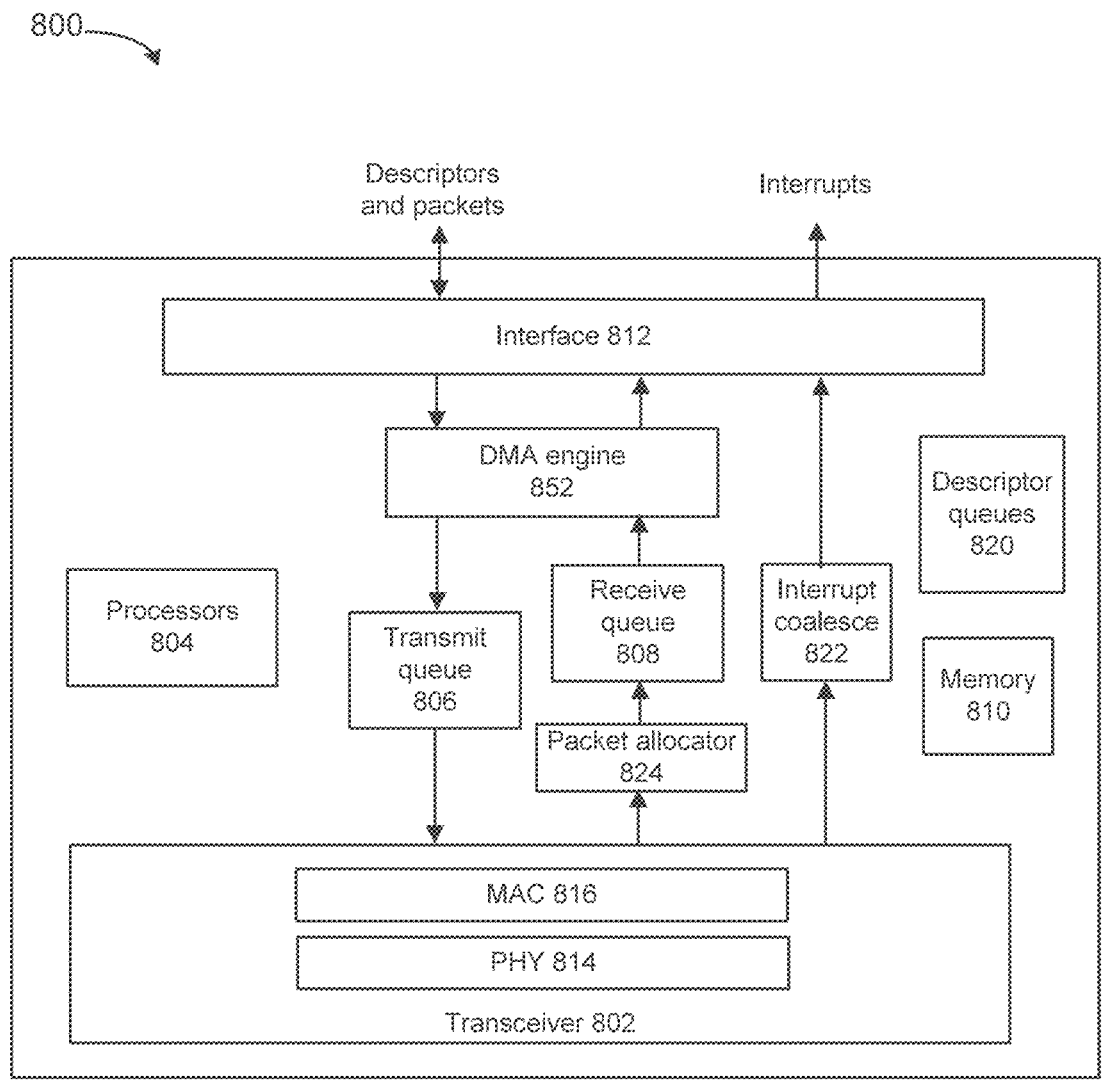
FIG. 8 depicts an example network interface in accordance with some embodiments.

FIG. 8 depicts a network interface. Various embodiments can use the network interface or be used by the network interface. Network interface 800 can use transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

Figure 9:
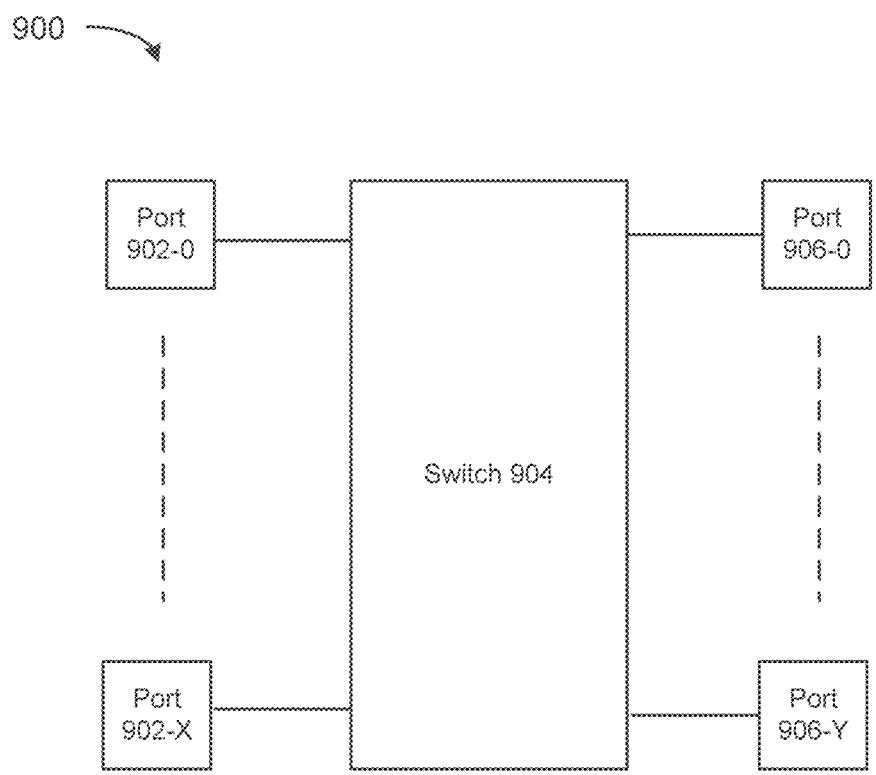
FIG. 9 depicts an example switch in accordance with some embodiments.

FIG. 9 depicts a switch. Various embodiments can be used in or with the switch of FIG. 9. Switch 904 can route packets or frames of any format or in accordance with any specification from any port 902-0 to 902-X to any of ports 906-0 to 906-Y (or vice versa). Any of ports 902-0 to 902-X can be connected to a network of one or more interconnected devices. Similarly, any of ports 906-0 to 906-X can be connected to a network of one or more interconnected devices. Switch 904 can decide which port to transfer packets or frames to using a table that maps packet characteristics with an associated output port. In addition, switch 904 can perform packet replication for forwarding of a packet or frame to multiple ports and queuing of packets or frames prior to transfer to an output port.

Figure 10:
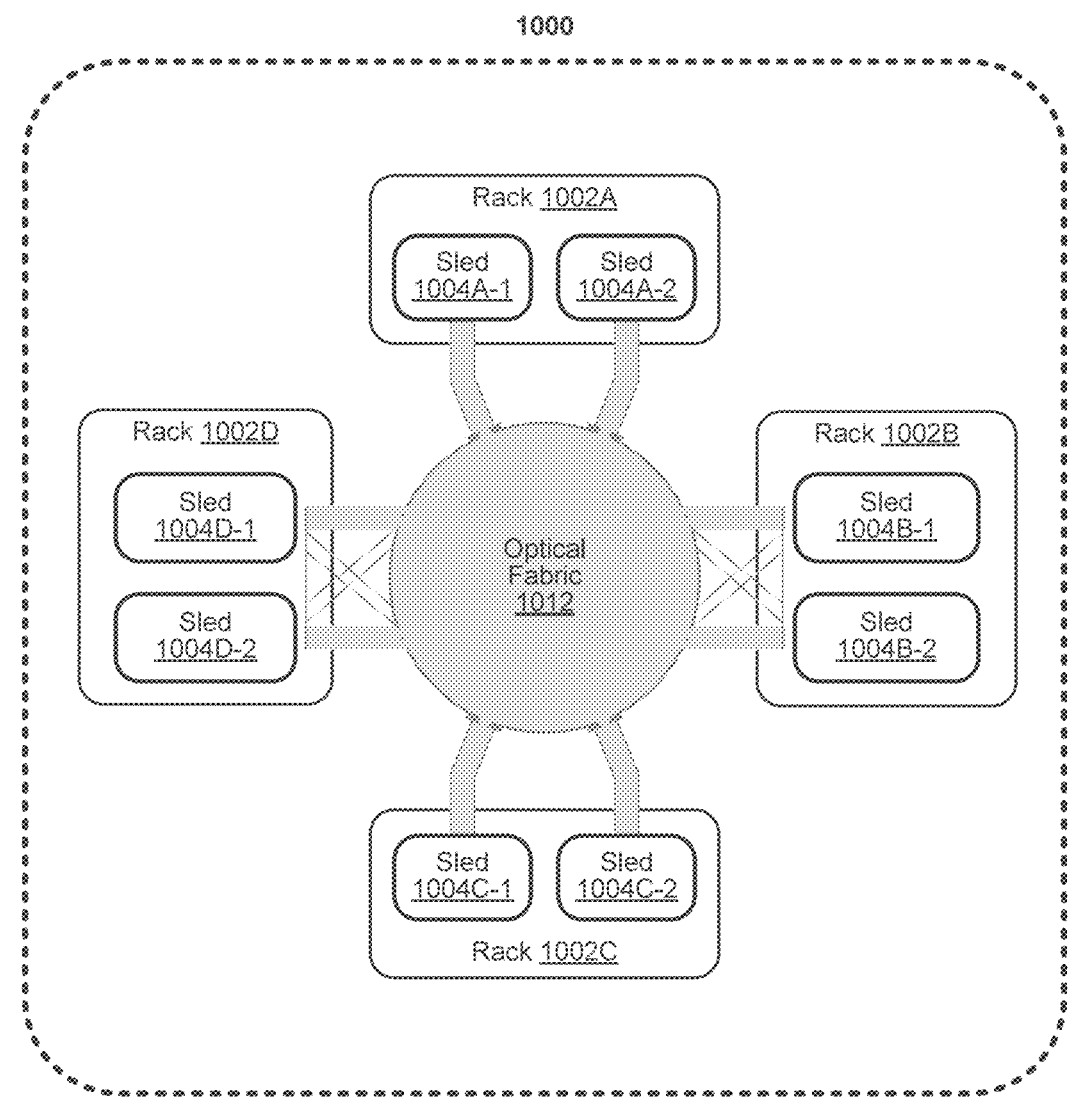
FIG. 10 depicts an example of a data center in accordance with some embodiments.

FIG. 10 depicts an example of a data center. Various embodiments can be used in or with the data center of FIG. 10. As shown in FIG. 100, data center 1000 may include an optical fabric 1012. Optical fabric 1012 may generally include a combination of optical signaling media (such as optical cabling) and optical switching infrastructure via which any particular sled in data center 1000 can send signals to (and receive signals from) the other sleds in data center 1000. The signaling connectivity that optical fabric 1012 provides to any given sled may include connectivity both to other sleds in a same rack and sleds in other racks. Data center 1000 includes four racks 1002A to 1002D and racks 1002A to 1002D house respective pairs of sleds 1004A-1 and 1004A-2, 1004B-1 and 1004B-2, 1004C-1 and 1004C-2, and 1004D-1 and 1004D-2. Thus, in this example, data center 1000 includes a total of eight sleds. Optical fabric 10012 can provide sled signaling connectivity with one or more of the seven other sleds. For example, via optical fabric 10012, sled 1004A-1 in rack 1002A may possess signaling connectivity with sled 1004A-2 in rack 1002A, as well as the six other sleds 1004B-1, 1004B-2, 1004C-1, 1004C-2, 1004D-1, and 1004D-2 that are distributed among the other racks 1002B, 1002C, and 1002D of data center 1000. The embodiments are not limited to this example. For example, fabric 1012 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

What is claimed is:

1. A non-transitory computer-readable medium comprising instructions stored thereon, that if executed by one or more cores, cause the one or more cores to:
   execute a first scheduler using a thread on a first core; and
   execute a second scheduler using a thread on a second core, wherein the first core is separate from the second core, the first scheduler is to allocate bandwidth for one or more packets of a first class of service, the second scheduler is to allocate bandwidth for one or more packets of a second class of service, and the second class of service is lower than the first class of service.

2. The computer-readable medium of claim 1, wherein the one or more packets of the first class of service are associated with a first ring and the one or more packets of the second class of service are associated with a second ring and wherein the first ring is associated with the first core and the second ring is associated with the second core.

3. The computer-readable medium of claim 1, wherein the first scheduler and the second scheduler are consistent with one or more of: OpenDataPlane (ODP) or Data Plane Development Kit (DPDK).

4. The computer-readable medium of claim 1, wherein the first scheduler and the second scheduler are to implement hierarchical quality of service (HQoS) to provide different qualities of service to different users.

5. The computer-readable medium of claim 1, wherein the first scheduler is to allocate transmit bandwidth for users of the first class of service and the second scheduler is to allocate transmit bandwidth for users of the second class of service.

6. The computer-readable medium of claim 5, wherein:
   the first scheduler is to determine a scheduling status of the one or more packets of the first class of service, the scheduling status comprising one of: transmit, drop, or wait until next time slot and
   the second scheduler is to determine a scheduling status of the one or more packets of the second class of service, the scheduling status comprising one of: transmit, drop, or wait until next time slot.

7. The computer-readable medium of claim 1, wherein:
   the first scheduler is to indicate excess bandwidth after allocation of bandwidth for a first time slot to the one or more packets of the first class of service and
   the second scheduler is to allocate a portion of the excess bandwidth to the one or more packets of the second class of service.

8. The computer-readable medium of claim 1, wherein:
   an amount of bandwidth allocated to the first scheduler to allocate to the one or more packets of the first class of service during a time slice is based, at least in part, on bandwidth allocation and consumption of traffic classes in one or more previous time slices and
   an amount of bandwidth allocated to the second scheduler to allocate to the one or more packets of the second class of service during a time slice is based, at least in part, on bandwidth allocation and consumption of traffic classes in one or more previous time slices.

9. An apparatus comprising:
   a memory to store one or more packets;
   a first core to execute a first scheduler using a thread; and
   a second core to execute a second scheduler using a thread, wherein the first core is separate from the second core, the first scheduler is to allocate bandwidth for one or more packets of a first class of service, the second scheduler is to allocate bandwidth for one or more packets of a second class of service, and the second class of service is lower than the first class of service.

10. The apparatus of claim 9, wherein the one or more packets of the first class of service are associated with a first ring and the one or more packets of the second class of service are associated with a second ring and wherein the first ring is associated with the first core and the second ring is associated with the second core.

11. The apparatus of claim 9, wherein the first scheduler and the second scheduler are consistent with one or more of: OpenDataPlane (ODP) or Data Plane Development Kit (DPDK).

12. The apparatus of claim 9, wherein the first scheduler and the second scheduler are to implement hierarchical quality of service (HQoS) to provide different qualities of service to different users.

13. The apparatus of claim 9, wherein the first scheduler is to allocate transmit bandwidth for users of the first class of service and the second scheduler is to allocate transmit bandwidth for users of the second class of service.

14. The apparatus of claim 13, wherein:
the first scheduler is to determine a scheduling status of the one or more packets of the first class of service, the scheduling status comprising one of: transmit, drop, or wait until next time slot and
the second scheduler is to determine a scheduling status of the one or more packets of the second class of service, the scheduling status comprising one of: transmit, drop, or wait until next time slot.

15. The apparatus of claim 9, wherein:
the first scheduler is to indicate excess bandwidth after allocation of bandwidth for a first time slot to the one or more packets of the first class of service and
the second scheduler is to allocate a portion of the excess bandwidth to the one or more packets of the second class of service.

16. The apparatus of claim 9, wherein:
an amount of bandwidth allocated to the first scheduler to allocate to the one or more packets of the first class of service during a time slice is based, at least in part, on bandwidth allocation and consumption of traffic classes in one or more previous time slices and
an amount of bandwidth allocated to the second scheduler to allocate to the one or more packets of the second class of service during a time slice is based, at least in part, on bandwidth allocation and consumption of traffic classes in one or more previous time slices.

17. The apparatus of claim 9, comprising a network interface with one or more egress ports, the network interface to transmit one or more packets according to the allocated bandwidth by the first and second schedulers.

18. The apparatus of claim 17, comprising: a server or datacenter, the server or datacenter to process one or more packets prior to allocation for transmission.

19. A method comprising:
execute a first scheduler using a thread on a first core and
executing a second scheduler using a thread on a second core, wherein the first core is separate from the second core, the first scheduler is to allocate bandwidth for one or more packets of a first class of service, the second scheduler is to allocate bandwidth for one or more packets of a second class of service, and the second class of service is lower than the first class of service.

20. The method of claim 19, wherein the one or more packets of the first class of service are associated with a first ring and the one or more packets of the second class of service are associated with a second ring and wherein the first ring is associated with the first core and the second ring is associated with the second core.

21. The method of claim 19, comprising:
determining a scheduling status of the one or more packets of the first class of service, using the first scheduler, the status comprising one of: transmit, drop, or wait until next time slot and
determining a scheduling status of the one or more packets of the second class of service, using the second scheduler, the status comprising one of: transmit, drop, or wait until next time slot.

* * * * *